(12) United States Patent
Riedlinger et al.

(10) Patent No.: US 6,647,464 B2
(45) Date of Patent: Nov. 11, 2003

(54) SYSTEM AND METHOD UTILIZING SPECULATIVE CACHE ACCESS FOR IMPROVED PERFORMANCE

(75) Inventors: Reid James Riedlinger, Fort Collins, CO (US); Dean A. Mulla, Saratoga, CA (US); Tom Grutkowski, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,546

(22) Filed: Feb. 18, 2000

(65) Prior Publication Data

US 2002/0169929 A1 Nov. 14, 2002

(51) Int. Cl.$^7$ .............................................. G06F 12/00
(52) U.S. Cl. ..................... 711/122; 711/118; 711/119; 711/120; 711/137; 711/141; 711/204; 711/206
(58) Field of Search ........................... 711/3, 118–120, 711/122, 137, 141, 204, 206

(56) References Cited

U.S. PATENT DOCUMENTS

| | | | | |
|---|---|---|---|---|
| 4,899,275 A | * | 2/1990 | Sachs et al. ................... 711/3 |
| 5,179,675 A | * | 1/1993 | Cole et al. ..................... 711/3 |
| 5,493,660 A | * | 2/1996 | DeLano et al. ............. 711/206 |
| 5,577,225 A | * | 11/1996 | McClure ..................... 711/118 |
| 5,737,569 A | * | 4/1998 | Nadir et al. ................. 711/149 |
| 5,745,729 A | | 4/1998 | Greenley et al. ........... 711/122 |
| 5,835,934 A | | 11/1998 | Tran ............................... 711/3 |
| 5,918,245 A | * | 6/1999 | Yung ........................... 711/122 |
| 5,956,752 A | * | 9/1999 | Mathews ..................... 711/204 |
| 6,021,471 A | | 2/2000 | Stiles et al. ................. 711/140 |
| 6,138,208 A | * | 10/2000 | Dhong et al. ............... 711/122 |
| 6,226,713 B1 | | 5/2001 | Mechrotra ................... 711/118 |
| 6,237,064 B1 | * | 5/2001 | Kumar et al. ............... 711/122 |
| 6,272,597 B1 | | 8/2001 | Fu et al. ...................... 711/131 |
| 6,272,601 B1 | | 8/2001 | Nunez et al. ............... 711/140 |
| 6,427,188 B1 | * | 7/2002 | Lyon et al. ................. 711/122 |
| 6,438,657 B1 | * | 8/2002 | Gilda .......................... 711/122 |
| 6,507,892 B1 | * | 1/2003 | Mulla et al. ................ 711/131 |

* cited by examiner

*Primary Examiner*—T. Nguyen

(57) ABSTRACT

A system and method are disclosed which provide a cache structure that allows early access to the cache structure's data. A cache design is disclosed that, in response to receiving a memory access request, begins an access to a cache level's data before a determination has been made as to whether a true hit has been achieved for such cache level. That is, a cache design is disclosed that enables cache data to be speculatively accessed before a determination is made as to whether a memory address required to satisfy a received memory access request is truly present in the cache. In a preferred embodiment, the cache is implemented to make a determination as to whether a memory address required to satisfy a received memory access request is truly present in the cache structure (i.e., whether a "true" cache hit is achieved). Although, such a determination is not made before the cache data begins to be accessed. Rather, in a preferred embodiment, a determination of whether a true cache hit is achieved in the cache structure is performed in parallel with the access of the cache structure's data. Therefore, a preferred embodiment implements a parallel path by beginning the cache data access while a determination is being made as to whether a true cache hit has been achieved. Thus, the cache data is retrieved early from the cache structure and is available in a timely manner for use by a requesting execution unit.

32 Claims, 3 Drawing Sheets

SYSTEM AND METHOD UTILIZING SPECULATIVE CACHE ACCESS FOR IMPROVED PERFORMANCE

RELATED APPLICATIONS

This application is related to co-pending and commonly assigned patent application Ser. No. 09/501,396 entitled "METHOD AND SYSTEM FOR EARLY TAG ACCESSES FOR LOWER-LEVEL CACHES IN PARALLEL WITH FIRST-LEVEL CACHE," filed Feb. 9, 2000; and co-filed and commonly assigned patent application Ser. No. 09/507,241 entitled "METHOD AND SYSTEM FOR PROVIDING A HIGH BANDWIDTH CACHE THAT ENABLES SIMULTANEOUS READS AND WRITES WITHIN THE CACHE," the disclosures of which are hereby incorporated herein by reference.

TECHNICAL FIELD

This invention relates in general to cache accesses in a processor, and in specific to a system and method for speculatively accessing data in a cache before verifying a tag hit for such cache.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is generally transparent to a computer program at the instruction level and can thus be added to a computer architecture without changing the instruction set or requiring modification to existing programs.

Computer processors typically include cache for storing data. When executing an instruction that requires access to memory (e.g., read from or write to memory), a processor typically accesses cache in an attempt to satisfy the instruction. Of course, it is desirable to have the cache implemented in a manner that allows the processor to access the cache in an efficient manner. That is, it is desirable to have the cache implemented in a manner such that the processor is capable of accessing the cache (i.e., reading from or writing to the cache) quickly so that the processor may be capable of executing instructions quickly.

Prior art cache designs for computer processors typically require "control data" to be available before a cache data access begins. Such "control data" indicates whether a desired address (i.e., an address required for a memory access request) is contained within the cache. Accordingly, prior art caches are typically implemented in a serial fashion, wherein upon the cache receiving a memory access request, control data is obtained for the request, and thereafter if the control data indicates that the desired address is contained within the cache, the cache's data array is accessed to satisfy the memory access request.

Thus, prior art cache designs typically generate control data indicating whether a true cache "hit" has been achieved for a level of cache, and only after a true cache hit has been achieved is the cache data actually accessed to satisfy the memory access request. A true cache "hit" occurs when a processor requests an item from a cache and the item is actually present in the cache. A cache "miss" occurs when a processor requests an item from a cache and the item is not present in the cache. The control data indicating whether a "true" cache hit has been achieved for a level of cache typically comprises a tag match signal. The tag match signal indicates whether a match was made for a requested address in the tags of a cache level. However, such a tag match signal alone does not indicate whether a true cache hit has been achieved.

As an example, in a multi-processor system, a tag match may be achieved for a cache level, but the particular cache line for which the match was achieved may be invalid. For instance, the particular cache line may be invalid because another processor has snooped out that particular cache line. Accordingly, in multi-processor systems a MESI signal is also typically utilized to indicate whether a line in cache is "Modified and Exclusive, Shared, or Invalid." Therefore, the control data that indicates whether a true cache hit has been achieved for a level of cache typically comprises a MESI signal, as well as the tag match signal. Only if a tag match is found for a level of cache and the MESI protocol indicates that such tag match is valid, does the control data indicate that a true cache hit has been achieved. In view of the above, in prior art cache designs a determination is first made as to whether a tag match is found for a level of cache, and then a determination is made as to whether the MESI protocol indicates that a tag match is valid. Thereafter, if a determination has been made that a true tag hit has been achieved, access begins to the actual cache data requested.

Typically, in multi-level cache designs, the first level of cache (i.e., L0) is first accessed to determine whether a true cache hit for a memory access request is achieved. If a true cache hit is not achieved for the first level of cache, then a determination is made for the second level of cache (i.e., L1), and so on, until the memory access request is satisfied by a level of cache. If the requested address is not found in any of the cache levels, the processor then sends a request to the system's main memory in an attempt to satisfy the request. In many processor designs, the time required to access an item for a true cache hit is one of the primary limiters for the clock rate of the processor if the designer is seeking a single-cycle cache access time. In other designs, the cache access time may be multiple cycles, but the performance of a processor can be improved in most cases when the cache access time in cycles is reduced. Therefore, optimization of access time for cache hits is critical for the performance of the computer system.

Turning to FIG. 1, an example of a typical cache design of the prior art is shown. Typically, when an instruction requires access to a particular address, a virtual address is provided from the processor to the cache system. As is well-known in the art, such virtual address typically contains an index field and a virtual page number field. The virtual address is input into a translation look-aside buffer ("TLB") 10. TLB 10 is a common component of modern cache architectures that is well known in the art. TLB 10 provides a translation from the received virtual address to a physical address. Within a computer system, the virtual address space is typically much larger than the physical address space. The physical address space is the actual, physical memory address of a computer system, which includes cache, main memory, a hard drive, and anything else that the computer can access to retrieve data. Thus, for a computer system to be capable of accessing all of the physical address space, a complete physical mapping from virtual addresses to physical addresses is typically provided.

Once the received virtual address is translated into a physical address by the TLB 10, the index field of such physical address is input into the cache level's tag(s) 12, which may be duplicated N times for N "ways" of associativity. As used herein, the term "way" refers to a partition of the cache. For example, the cache of a system may be partitioned into any number of ways. Caches are commonly partitioned into four ways. The physical address index is also input to the cache level's data array(s) 16, which may also be duplicated N times for N ways of associativity.

From the cache level's tag(s) 12, a way tag match signal is generated for each way. The way tag match signal indicates whether a match for the physical address was made within the cache level's tag(s) 12. As discussed above, in multi-processor systems, a MESI protocol is typically utilized to indicate whether a line in cache is modified and exclusive, shared, or invalid. Accordingly, in such multi-processor systems the MESI protocol is combined with the way tag match signal to indicate whether a "true" tag hit has been achieved for a level of cache. Thus, in multi-processor systems a true tag hit is achieved when both a tag match is found for tag(s) 12 and the MESI protocol indicates that such tag match is a valid match. Accordingly, in FIG. 1, MESI circuitry 14 is utilized to calculate a "true" tag hit signal to determine whether a true tag hit has been achieved for that level of cache. Once it is determined from the MESI 14 that a "true" tag hit has been achieved for that level of cache, then that cache level's data array(s) 16, which may also be duplicated N times for N ways of associativity, are accessed to satisfy the received memory access request. More specifically, the true tag hit signal may be used to control a multiplexer ("MUX") 18 to select the appropriate data array way to output data to satisfy the received memory access request. The selected data from data array(s) 16 is output to the chip's core 20, which is the particular execution unit (e.g., an integer execution unit or floating point execution unit) that issued the memory access request to the cache.

In view of the above, prior art caches are typically implemented in a serial fashion, wherein the physical address is first determined, then whether a tag match is achieved for the requested physical address within a particular level of cache is determined, then whether a "true" cache hit is achieved within the particular level of cache is determined, and finally the data array(s) for the particular level of cache are accessed if a "true" cache hit has been achieved. Thus, even though prior art caches determine the physical address relatively early, the cache's data is not accessed until it has been determined whether a "true" cache hit has been achieved for the cache. Such a serial access of cache data is disadvantageous in that it is slow. Such a serial cache implementation generally adds one to two clock cycles of data access latency because the cache tags and MESI must first complete to determine whether a valid hit has been achieved for the cache before beginning the data access. Thus, such a serial access of cache data requires an undesirably long time to access the cache data. Therefore, serial cache designs of the prior art increase latency in retrieving data from cache, which slows the execution unit within the core of a chip. That is, while an execution unit is awaiting data from cache, it is stalled, which results in a net lower performance for a system's processor.

SUMMARY OF THE INVENTION

In view of the above, a desire exists for a cache design that allows for cache data to be accessed in a timely manner. That is, a desire exists for a cache design that decreases the latency in retrieving data from cache that is present in prior art cache designs. A further desire exists for a cache design that allows for cache data to be accessed in a timely manner, while still verifying that a true tag hit has been achieved for the cache in order to ensure that the appropriate data is being accessed to satisfy a memory access request. Accordingly, a desire exists for a cache design that allows for cache data to be accessed quickly, thereby reducing the number of stalls required in the execution units requesting memory access and enhancing the overall performance the system.

These and other objects, features and technical advantages are achieved by a system and method which provide a cache design that, in response to receiving a memory access request, begins an access to a cache level's data before a determination has been made as to whether a true hit has been achieved for the cache level. That is, a system and method are provided which enable cache data to be speculatively accessed before a determination is made as to whether a memory address required to satisfy a memory access request is truly present in the cache.

In a preferred embodiment, a cache structure is provided that receives memory access requests from at least one processor of a computer system. In response to receiving such a memory access request, the cache structure begins an access of its data array(s) in an attempt to satisfy the received request, without first determining whether a memory address required to satisfy the received memory access request is truly present in the cache structure. In a most preferred embodiment, such a cache structure is a level of a multi-level cache implemented for a computer system.

In a preferred embodiment, the cache is implemented such that a determination is made as to whether a memory address required to satisfy a received memory access request is truly present in the cache structure. That is, a preferred embodiment determines whether a true cache hit is achieved in the cache structure for a received memory access request. Although, such a determination is not made before the cache data begins to be accessed. Rather, in a preferred embodiment, a determination of whether a true cache hit is achieved in the cache structure is performed in parallel with the access of the cache structure's data for a received memory access request. That is, a preferred embodiment determines whether a tag match is achieved for the cache structure's tags and whether a MESI protocol verifies that an achieved tag match is a valid match in parallel with accessing the cache structure's data array(s). Therefore, rather than the serial path of prior art cache designs in which a tag match is first determined, then a match is verified with a MESI protocol, then the cache data is accessed to satisfy a received memory access request, a preferred embodiment implements a parallel path by beginning the cache data access while a determination is being made as to whether a true cache hit has been achieved. Thus, the cache data is retrieved early from the cache structure and is available in a timely manner for use by a requesting execution unit, once it is determined that a true cache hit has been achieved for the cache structure.

In a preferred embodiment, the data access is begun before determining whether a true cache hit is achieved only for memory access requests that are data read requests. Thus, for "write" requests a preferred embodiment first determines whether a true cache hit is achieved before beginning the requested write.

It should be appreciated that a technical advantage of one aspect of the present invention is that a cache structure is implemented to allow for faster access of the cache structure's data by beginning the data access before it is determined whether a true cache hit is achieved for the cache structure. Accordingly, the cache design allows for cache data to be accessed in a timely manner. A further technical advantage of one aspect of the present invention is that a cache structure is implemented that allows for cache data to be accessed in a timely manner, while still verifying that a true tag hit has been achieved for the cache in order to ensure that the appropriate data is being accessed to satisfy a received memory access request. Yet a further technical advantage of one aspect of the present invention is that a cache structure is implemented such that the cache structure's data is accessed in parallel with determining whether a true cache hit is achieved for the cache structure, thereby decreasing the latency in retrieving data from cache that is present in prior art cache designs. That is, a cache structure is implemented that allows for cache data to be accessed quickly, thereby reducing the number of stalls required in the execution units requesting memory access and enhancing the overall performance of the system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 2:
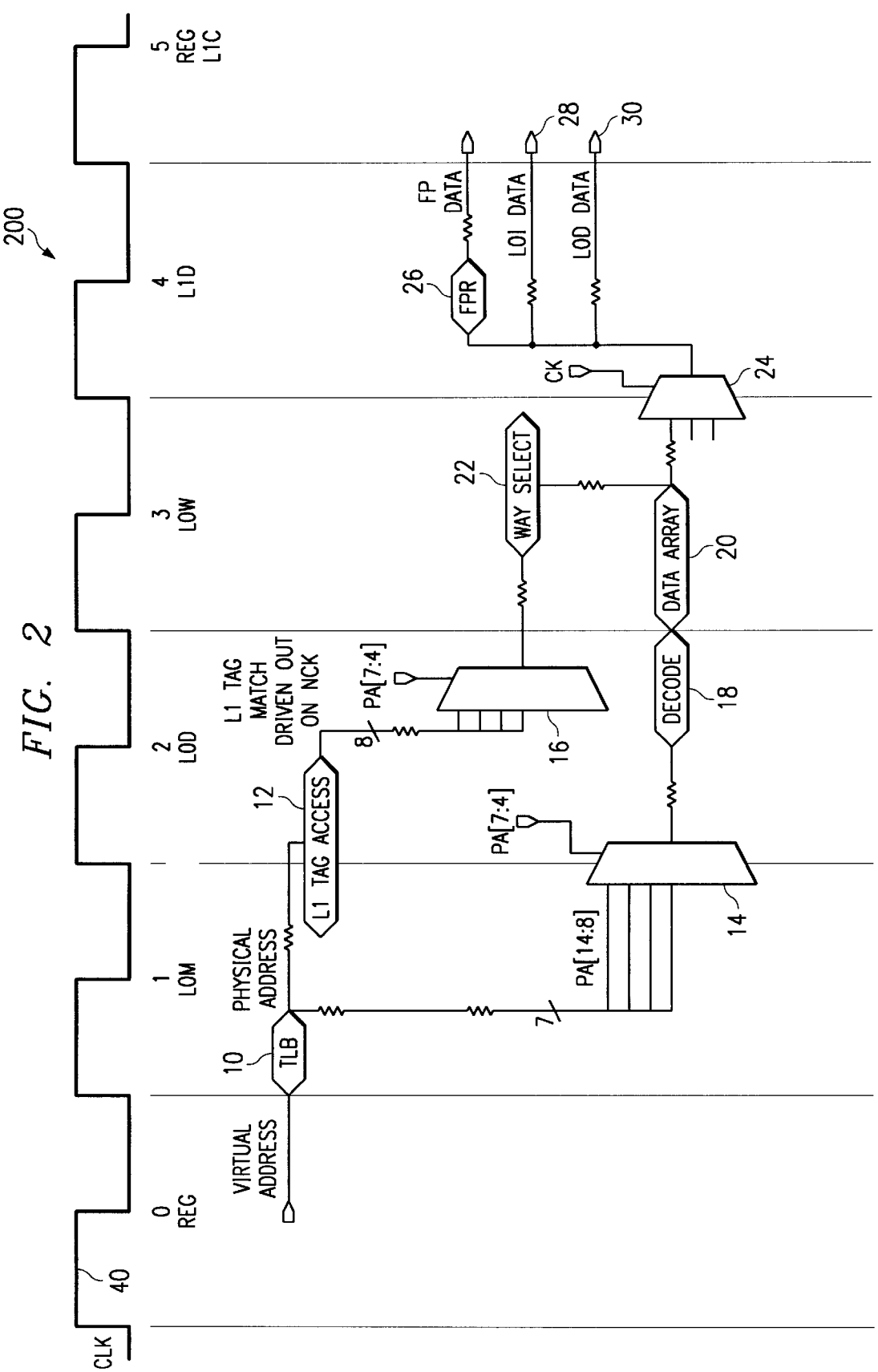
FIG. 2 shows a preferred embodiment for a cache design of the present invention.

Turning to FIG. 2, a preferred embodiment of the present invention is shown. As shown, execution of a preferred embodiment of a cache design 200 is illustrated in conjunction with a clock signal 40 to illustrate the execution flow through various pipe stages. Generally, a "pipe stage" is an individual clock cycle that is utilized for the occurrence of certain event(s) of a memory access. Because the use of pipe stages is well-known in the art, it will not be discussed in any greater detail herein. FIG. 2 illustrates a preferred embodiment implemented for level L1 of cache. However, it should be understood that such design may be implemented for any level of cache and is not intended to be limited solely to L1.

Figure 1:
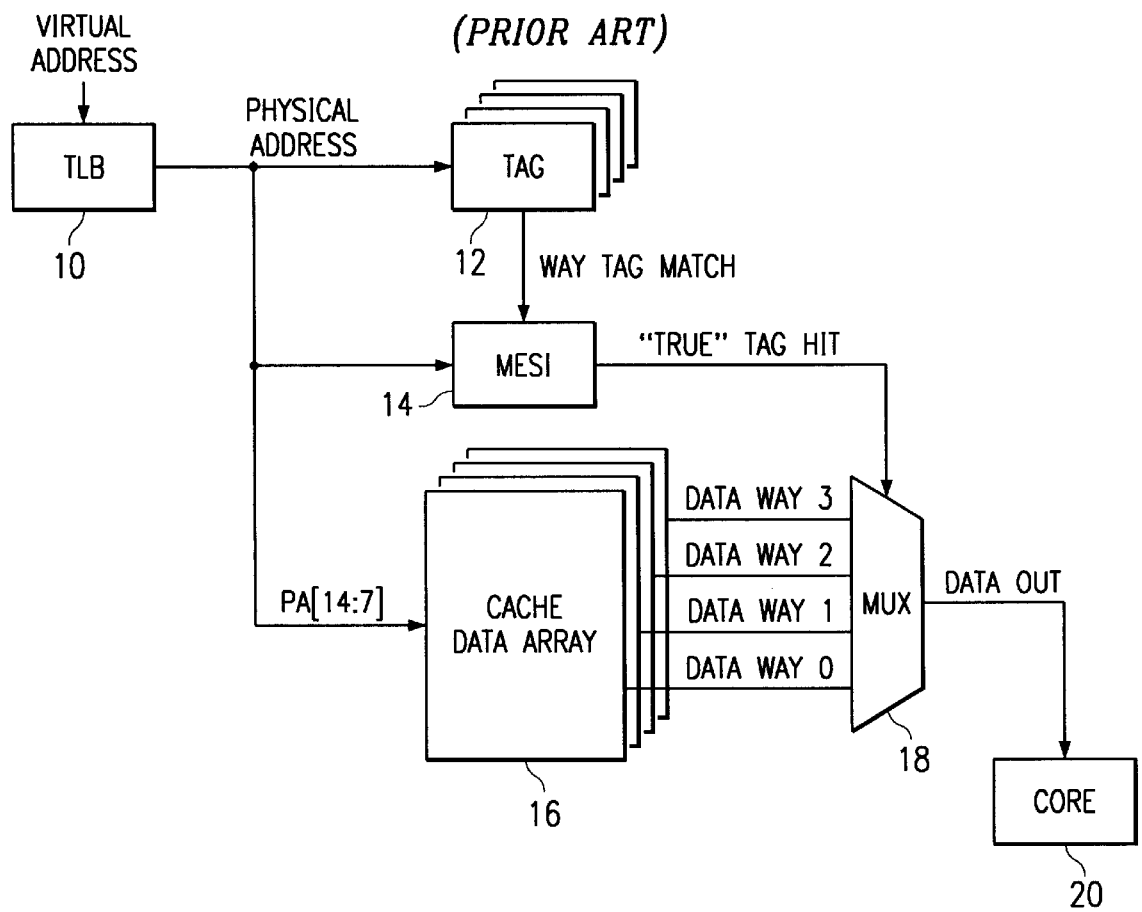
FIG. 1 shows a typical cache design of the prior art, which determines whether a "true" tag hit is achieved for a cache level and then accesses the cache data in series.
Figure 3:
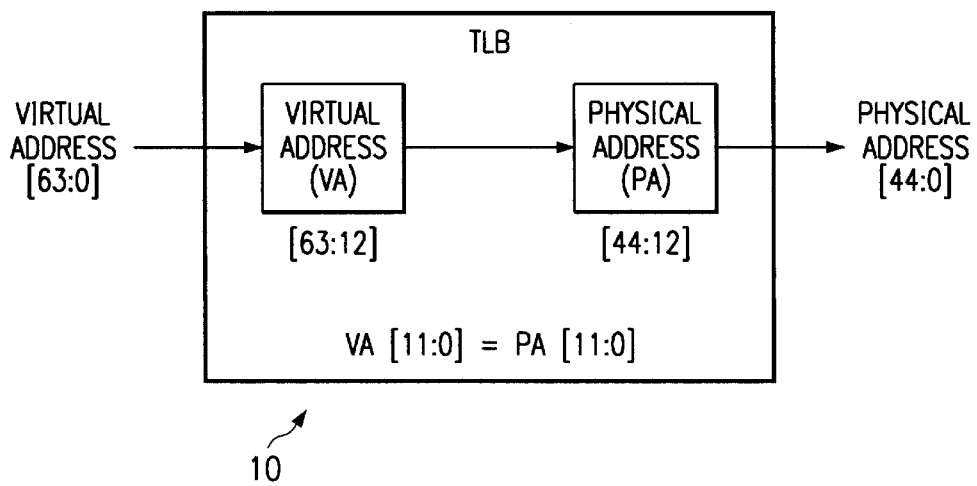
FIG. 3 shows a TLB implemented in a preferred embodiment.

In the REG 0 pipe stage, level L1 of cache 200 receives a virtual address for a memory access request from cache level L0, which is input to a translation look-aside buffer ("TLB") 10 at the beginning of the L0M pipe stage. In the first clock phase (the clock high phase) of L0M, TLB 10 translates the received virtual address into a physical address. As discussed above, TLB 10 is a common component of modern cache architectures that is well known in the art. Turning briefly to FIG. 3, a preferred implementation for TLB 10 is illustrated. As shown in FIG. 3, in a preferred embodiment, a 64 bit virtual address (VA[63:0]) is received by TLB 10, and a 45 bit physical address (PA[44:0]) is output by TLB 10. Although, in alternative embodiments, any number of bits may be utilized for the virtual address and physical address. As illustrated in FIG. 3, TLB 10 receives a virtual address (VA[63:0]) and translates such virtual address into a physical address (PA[44:0]).

In most cache architectures, the lower address bits of the virtual address and the physical address match. As shown in FIG. 3, in a preferred embodiment, the lower twelve bits of the virtual address (VA[11:0]) match the lower twelve bits of the physical address (PA[11:0]). Although, in alternative embodiments, any number of bits of the virtual address and physical address may match. Because the lower twelve bits of the virtual address and physical address match in a preferred embodiment, TLB 10 translates the non-matching bits of the virtual address (VA[63:12]) into the appropriate physical address PA[44:12]. That is, TLB 10 performs a look-up to determine the mapping for the received virtual address. Generally, there exists only one mapping in TLB 10 for the received virtual address. Because PA[11:0] corresponds to VA[11:0] and TLB 10 translates VA[63:12] into PA[44:12], the entire physical address PA[44:0] is determined and output by TLB 10.

Figure 4:
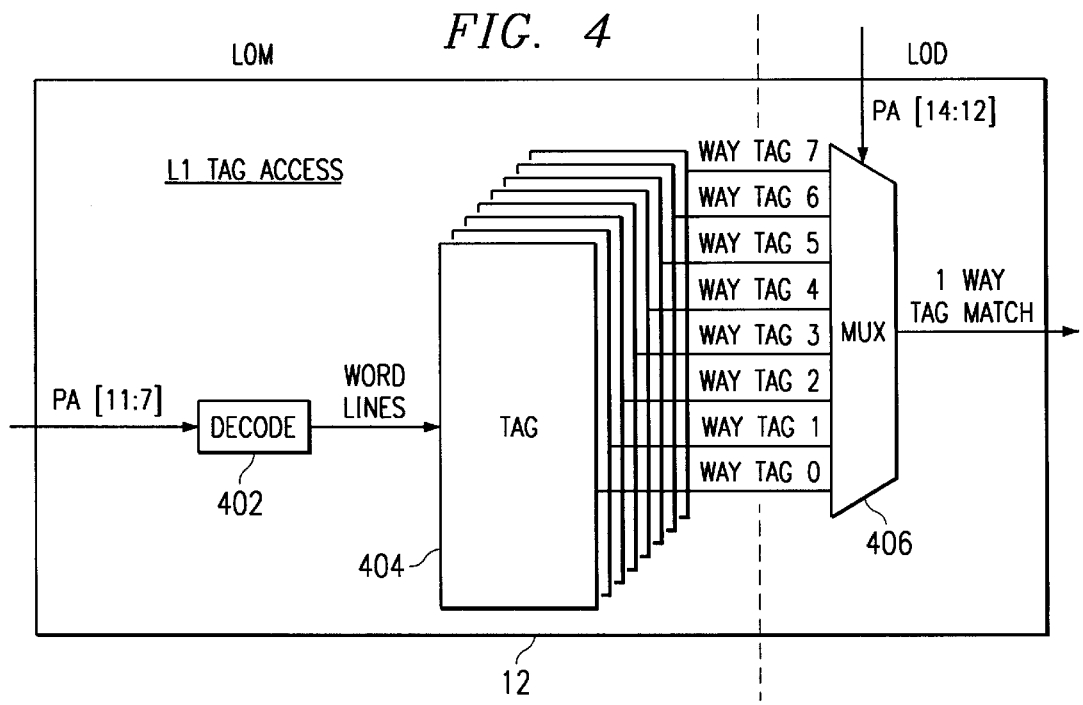
FIG. 4 shows circuitry implemented for a cache tag access of a preferred embodiment.

Turning back to FIG. 2, in the second clock phase (the clock low phase) of the L0M pipe stage, the cache level's tag(s) are accessed, illustrated as L1 Tag access 12 (cache level one tag access). L1 Tag access 12 functions to access the cache level's tag(s) and determine a way tag match for the memory access request. Turning briefly to FIG. 4, a preferred embodiment for L1 Tag access 12 is shown in greater detail. In a preferred embodiment, the physical address bits are utilized for the tag access as soon as such physical address bits are known. As discussed above, in a preferred embodiment, the lower twelve bits of the physical address (PA[11:0]) are the same as the lower twelve bits of the virtual address (VA[11:0]). Thus, those bits do not require a TLB translation. Therefore, the lower twelve bits of the physical address (PA[11:0]) are known very early. That is, the lower twelve bits of the physical address (PA[11:0]) are known a whole cycle earlier than the entire physical address (PA[44:0]) because the lower twelve bits are known as soon as the virtual address is received. A preferred embodiment utilizes this known data by starting the L1 tag access path 12 early.

TLB 10 typically requires approximately one cycle to complete. In the second half of that cycle (the clock low phase), access to the cache's tag(s) begins, in a preferred embodiment. As shown in FIG. 4, physical address bits PA[11:7] are input to decode circuitry 402. Although, in alternative embodiments, any of the known physical address bits may be utilized for such decode. Decode circuitry 402 decodes the physical address bits PA[11:7] to determine the physical address required for the received memory access request, and then the word lines are fired. Once the word lines are fired, the tag(s) 404 are read out. In a preferred embodiment, the tags 404 are duplicated 8 times for 8 ways of associativity. Thus, in a preferred embodiment, when the word lines are fired, eight different tags are read out of tags 404. Of course, in alternative embodiments, any number of ways may be implemented for the cache.

As shown in FIG. 4, the decoding of PA[11:7] and reading out of tags 404 are performed in the L0M pipe stage. Thus, while TLB 10 is still completing, access of the L1 cache tags 404 is started, in a preferred embodiment. Accordingly, in a preferred embodiment, the TLB access and the cache tag access are performed in parallel. It will be recalled that prior art cache designs typically access the TLB and cache tags in series. That is, prior art cache designs typically first access the TLB and then begin the access to the cache tags only after completing the TLB. Thus, a preferred embodiment reduces the latency involved in determining whether a tag match is achieved by accessing the cache level's tag(s) early.

In the L0M pipe stage, a tag is read out for each way. Therefore, in a preferred embodiment, eight tags (way tag 0 through way tag 7) are read out in the L0M pipe stage. In a preferred embodiment, the tags are held to the L0D pipe stage. In the L0D pipe stage, TLB 10 has completed its translation and therefore the desired physical address PA[44:0] is known. That is, in the L0D pipe stage TLB 10 has completed its mapping of the virtual address to determine the bits of the physical address that were initially unknown (PA[44:12]). In a preferred embodiment, bits [14:12] of the physical address (i.e., PA[14:12]) are utilized in the L0D pipe stage to select one of the eight tags read out of the tag array 404 in the L0M pipe stage. In alternative embodiments, any of the bits of the physical address that result from the mapping of the TLB 10 (e.g., any of the PA[44:12] bits) may be utilized to select one of the tags read out in the L0M pipe stage. In a preferred embodiment, the eight tags read out of the tag array 404 are input to a MUX 406, and the PA[14:12] bits are utilized to control MUX 406. Thus, the PA[14:12] bits are utilized to select the appropriate way tag to be output by MUX 406.

Thus, in the L0D pipe stage, a way tag match signal is generated from MUX 406. It should be understood that this is not a "true" tag hit signal because the MESI information has not been combined with the match signal at this point. Rather, the tag access 12 generates strictly a way tag match signal. Turning back to FIG. 2, it is shown that in the first phase (the clock high phase) of L0D, L1 Tag access 12 is completing the tag match path, as discussed above with reference to FIG. 4. In parallel with L1 Tag access 12 completing, the first phase (the clock high phase) of L0D is utilized to drive the physical address data from TLB 10 out to the cache data array(s). Thus, in a preferred embodiment, the cache level's data array(s) begin to be accessed for an address before it is determined whether a "true" cache hit is achieved for the cache level. It will be recalled that prior art cache designs typically determine whether a true cache hit is achieved for a cache level and then begin access to the cache level's data array(s) in series. That is, prior art cache designs typically first determine whether a true cache hit is achieved for a level of cache, and begin an access of the cache level's data array(s) only after it has been determined that a true cache hit has been achieved. Thus, a preferred embodiment reduces the latency involved in accessing the cache level's data by speculatively accessing the data early.

More specifically, in a preferred embodiment, TLB 10 outputs a physical address in the second phase (the clock low phase) of L0M. In a preferred embodiment, bits [14:8] of the physical address are input to a MUX 14. Although, in alternative embodiments, any of the bits of the physical address may be utilized. In a most preferred embodiment, a 256 K-byte cache is implemented, which is banked into 16 banks having 128 lines per bank. Thus, in a most preferred embodiment, bits [14:8] of the physical address may be decoded to identify any of the 128 lines of a bank. Also, in a most preferred embodiment, bits [7:4] of the physical address are decoded to select to which bank an access is to be issued. Because these bits of the physical address are known early (e.g., they are known when the virtual address is received), the bank to be accessed can be selected early. Thus, a preferred embodiment enables the control circuitry to be set up early, thereby increasing the efficiency in accessing the memory. Of course, in alternative embodiments, any size cache may be implemented. Additionally, in alternative embodiments, any number of banks (i.e., from no banks to N banks) may be implemented for the cache. Generally, it is desirable to have the highest possible number of banks implemented for the cache.

As shown in FIG. 2, PA[14:8] of the output of TLB 10 is input to a dynamic MUX 14 in the second phase (the clock low phase) of L0M. Then in the first phase (the clock high phase) of the L0D pipe stage, MUX 14 outputs the PA[14:8], which is input to decode circuitry 18. Accordingly, in a preferred embodiment, the decode circuitry 18 begins its decode for the data array(s) 20 in parallel with the tag match being determined in the L1 Tag access 12 in the first phase (the clock high phase) of L0D. As decode circuitry 18 is decoding PA[14:8], tag match data from the L1 Tag access 12 completes at the end of the first phase (the clock high phase) of L0D. Such tag match data from the L1 Tag access 12 is input to a dynamic MUX 16, which outputs such tag match data in the second phase of L0D (the clock low phase). Therefore, MUX 16 is used in a preferred embodiment to select the appropriate bank for a way tag match. More specifically, PA[7:4] controls the operation of MUX 16 to route the way tag match to the appropriate bank. MUX 16 of a preferred embodiment is controlled by PA[7:4] to route the physical addresses to the appropriate bank. In the first phase (the clock high phase) of L0W, the decode circuitry 18 has completed and the access of the data array 20 begins for the decoded address. That is, in the first phase of L0W, the physical address decode is available from decode circuitry 18, and the word lines are fired causing eight ways of data to be read out of the data array 20 according to such decoded physical address. Accordingly, in the first phase of L0W the data arrays are speculatively accessed before a determination as to whether a true tag hit has been achieved for the L1 cache.

Then later in the first phase of the L0W pipe stage, the way select is input from way select circuitry 22 into the data array(s) 20. Such way select data is received later because it has the additional half-cycle access through the tags in the L1 Tag access 12. Therefore, in a preferred embodiment, the way select data is not received by the data array 20 until the end of the first phase (the clock high phase) of the L0W pipe stage. Only one of the eight ways of the cache will be high, and circuitry, such as a MUX (not shown), is utilized to select the data line read out of the cache data array 20 for the way that is high. That is, one of the eight data lines read out of the cache data array 20 is selected based on the way select signal from way select circuitry 22, and such selected data is sent to the requesting execution unit. For instance, a dynamic MUX 24 may be implemented to deliver the selected data at the first phase (the clock high phase) of the L1D pipe stage to the requesting execution unit. For example, MUX 24 may output the selected data to the requesting floating point unit 26, L0I instruction unit 28, or the L0D integer execution unit 30.

Figure 5:
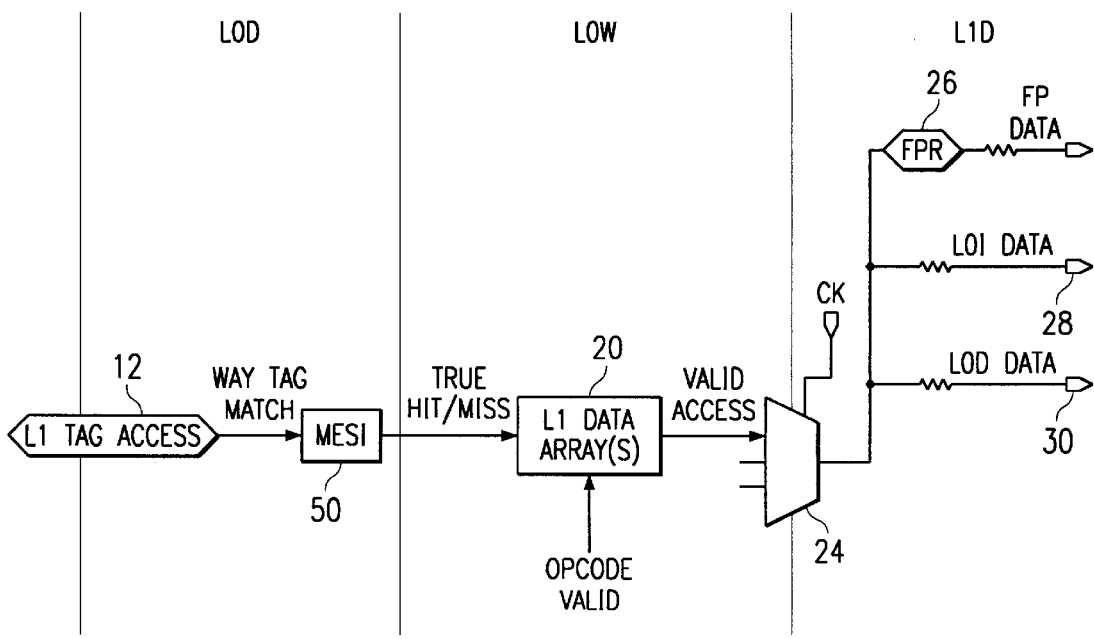
FIG. 5 shows circuitry implemented in a preferred embodiment to indicate whether a true cache hit is achieved for the cache level.

In a preferred embodiment, a determination is made as to whether a true cache hit is achieved for the cache level. Thus, even though the access to the cache level's data array(s) begins before a determination is made as to whether a true cache hit is achieved for the cache level, such determination is later made. Turning now to FIG. 5, a preferred embodiment for determining whether a true cache hit is achieved for a cache level is shown. As shown, the L1T access 12 is completed in the first phase (the clock high phase) of the L0D pipe stage. In a preferred embodiment, the way tag match data output by L1T access 12 is combined with MESI signal 50 in the second phase (the clock low phase) of L0D. Thus, in a preferred embodiment, a true hit/miss signal is generated in the second phase of L0D by combining the MESI information with the tag match. The true hit/miss signal is input to the L1 data arrays 20 in the LOW pipe stage. Additionally, an "opcode" valid signal is input to the L1 data arrays 20, which indicates whether the received instruction was a valid operation. In a preferred embodiment, the opcode valid signal is combined with the true hit/miss signal to produce a valid access signal, which is then sent out to the requesting execution unit via MUX 24 in the first phase of L1D. For example, MUX 24 may send the valid access signal to a floating point unit 26, L0I instruction unit 28, or L0D integer execution unit 30. Such valid access signal indicates to the execution units that the data, which began to be accessed in L0D, is actually valid.

It should be understood that in a most preferred embodiment, the speculative cache data access as described herein is implemented only for a load path. That is, in a most preferred embodiment, the speculative cache data access is utilized only for received memory access requests desiring to read data from cache. Thus, for a most preferred embodiment, a determination of whether a true hit has been achieved for the cache level is made before accessing the cache level's data for a store path (i.e., for a received memory access request desiring to write data to cache). Reads may be performed speculatively with only a risk of wasting power by accessing a cache level's data and determining that the cache level missed (i.e., that the requested address is not in the cache level). However, if a write is performed speculatively, then the cache's data may be corrupted if a miss occurs. Accordingly, a most preferred embodiment reduces the latency required for accessing cache data to satisfy a received data read request.

Additionally, in a most preferred embodiment, multiple levels of a multi-level cache may be accessed in parallel. For example, in a most preferred embodiment, the physical address from the TLB 10 may be sent to the L2 cache to begin the access of the L2 cache data array(s) in parallel with the L1 cache data array(s) 20 in the L0D pipe stage. For example, the cache may be implemented so as to access multiple levels in parallel in the manner disclosed in U.S. patent application Ser. No. 09/501,396 entitled "METHOD AND SYSTEM FOR EARLY TAG ACCESSES FOR LOWER-LEVEL CACHES IN PARALLEL WITH FIRST-LEVEL CACHE," the disclosure of which is hereby incorporated herein by reference. Thus, in a most preferred embodiment, the cache may be implemented to hedge its bets, such that if the L1 cache misses, an access has already begun to the L2 cache. If the L1 hits, then a signal may be sent to the L2 cache, causing the L2 cache to abort its data access.

In a most preferred embodiment, the banking implementation described in the U.S. patent application Ser. No. 09/507,241 entitled "METHOD AND SYSTEM FOR PROVIDING A HIGH BANDWIDTH CACHE THAT ENABLES SIMULTANEOUS READS AND WRITES WITHIN THE CACHE," the disclosure of which is hereby incorporated herein by reference, may be implemented in this architecture to allow for increased bank width utilization. That is, the increased bandwidth disclosed in "METHOD AND SYSTEM FOR PROVIDING A HIGH BANDWIDTH CACHE THAT ENABLES SIMULTANEOUS READS AND WRITES WITHIN THE CACHE" may be implemented with the speculative cache data access design disclosed herein to further increase the system's performance.

As discussed above, in a preferred embodiment, an eight-way associative cache is implemented. However, it should be understood that various embodiments may be implemented having any number of ways, and any such implementation is intended to be within the scope of the present invention. Furthermore, it should be understood that no time penalty is inflicted by performing the speculative data access of a preferred embodiment. That is, in a preferred embodiment data is speculatively read out early with no time penalty inflicted if a miss occurs. If a miss occurs in the path of a preferred embodiment, a miss would have also occurred in the serial path of the prior art, but in the serial path the execution units would not be notified of such miss as soon. It should also be understood that a cache structure of the present invention may be implemented within any type of computer system having a processor, including but not limited to a personal computer (PC), laptop computer, and personal data assistant (e.g., a Palmtop PC).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of accessing cache, said method comprising the steps of:
   inputting a memory access request into a multi-level cache, wherein each level of said multi-level cache comprises a data array; and
   starting an access of data arrays of multiple levels of said multi-level cache in parallel without having first determined whether a memory address required to satisfy said memory access request is truly present in any of said multiple levels of said multi-level cache, wherein said starting comprises beginning an access of a tag array of a level of said multi-level cache before decoding an entire physical address for said memory access request for said level.

2. A The method of claim 1 wherein said memory access request is a data read request.

3. The method of claim 1 wherein said determining whether a memory address required to satisfy said memory access request is truly present in any of said multiple levels of said multi-level cache comprises the steps of:

determining whether a tag match is achieved for any of said multiple levels of said multi-level cache; and if determined that a tag match is achieved for a level of said multiple levels, then determining whether a MESI protocol indicates that said tag match is a valid tag match, wherein only if said tag match is a valid tag match is it determined that said memory address required to satisfy said memory access request is truly present in any of said multiple levels of said multi-level cache.

4. The method of claim 1 further comprising the step of:

determining whether the memory address required to satisfy said memory access request is truly present in a level of said multi-level cache.

5. The method of claim 4 further comprising the step of:

determining whether the memory address required to satisfy said memory access request is truly present in a level of said multi-level cache in parallel with said starting an access of said data arrays.

6. The method of claim 1 wherein said multi-level cache is partitioned into multiple ways.

7. The method of claim 1 wherein said starting an access comprises beginning a decode of a physical address to be accessed in said data array.

8. The method of claim 1 wherein said starting an access comprises inputting at least a portion of a physical address to decode circuitry associated with said data array.

9. A method of accessing a cache, said method comprising the steps of:

inputting a memory access request into a cache structure;

first receiving a virtual address for said memory access request in a TLB, wherein said TLB begins translation of said received virtual address to a physical address and wherein at least one bit of said virtual address is the same for said physical address;

then in parallel with said TLB translating said received virtual address to a physical address, beginning an access of said cache structure's tags using at least one of said at least one bit of said virtual address that is the same for said physical address;

once a physical address is output by said TLB, beginning a decode of at least part of said physical address to access said cache structure's data array(s); and in parallel with said decode, using MESI protocol to verify that a true tag hit is achieved for said cache structure.

10. A computer system comprising:

at least one processor that executes instructions;

multi-level cache structure accessible by said at least one processor to satisfy memory access requests, wherein each level of said multi-level cache structure comprises a data array and corresponding decode circuitry for said data array and wherein said multi-level cache structure is configured to receive into decode circuitry of a level of said multi-level cache structure at least a portion of a memory address for a received memory access request without first determining whether a memory address required to satisfy said received memory access request is truly present in said data array of said level of said multi-level cache structure; and wherein said level of said multi-level cache structure comprises tag match circuitry operable to determine whether a tag hit is achieved for said memory address in said level, and wherein said tag match circuitry is configured to receive at least part of said memory address before said decode circuitry of said level decodes said memory address.

11. The computer system of claim 10 wherein said multi-level cache structure further comprises:

a TLB that receives a virtual address for said memory access request and outputs a corresponding physical address.

12. The computer system of claim 11 wherein said decode circuitry decodes at least a portion of a physical address output by said TLB to determine a physical address to access in said data array.

13. The computer system of claim 10 wherein said level of said multi-level cache structure further comprises MESI circuitry that determines whether said tag hit is a true tag hit wherein said level of said multi-level cache is implemented such that said decode circuitry of said level begins executing before said MESI circuitry determines whether said tag hit is a true tag hit.

14. The computer system of claim 10 wherein said received memory access request is a data read request.

15. The computer system of claim 10 wherein said decode circuitry of said level receives said at least a portion of said memory address in parallel with execution of said tag match circuitry.

16. A multi-level cache structure that is accessible to at least one computer processor to satisfy memory access requests for instructions being executed by said at least one computer processor, said multi-level cache structure comprising:

a data array for each level of said multi-level cache structure;

means for receiving a memory access request from at least one processor;

means for beginning decode of a memory address for a received memory access request for multiple levels of said multi-level cache structure's data arrays in parallel without having first determined whether a memory address required to satisfy said received memory access request is truly present in said multi-level cache structure; and means for determining whether said memory address required to satisfy said received memory access request is truly present in a level of said multi-level cache, wherein said means for beginning decode begins said decode for said level in parallel with execution of the determining means.

17. The multi-level cache structure of claim 16 wherein said received memory access request is a data read request.

18. The multi-level cache structure of claim 16 wherein said receiving means comprises a TLB that translates a virtual address for said memory access request into a physical address, and wherein said beginning means comprises decode circuitry that decodes at least a portion of a physical address output by said TLB.

19. A method of accessing a cache, the method comprising:

receiving at a cache a virtual address for a memory access request, wherein a portion of the virtual address corresponds to a first portion of a physical address of said cache; and inputting said portion of said virtual address that corresponds to said first portion of said physical address to a tag array for said cache before determining an entire physical address.

20. The method of claim 19 further comprising:

inputting said virtual address to a TLB to determine said entire physical address in parallel with said inputting said portion of said virtual address to said tag array.

21. The method of claim 20 further comprising:

said TLB outputting said entire physical address.

22. The method of claim 21 further comprising:

inputting to said tag array a portion of said entire physical address output by said TLB that when combined with said first portion of said physical address forms said entire physical address.

23. The method of claim 21 further comprising:

inputting at least a portion of said entire physical address to decode circuitry for a data array before determining whether said data array is capable of satisfying said memory access request.

24. The method of claim 23 wherein said determining whether said data array is capable of satisfying said memory access request comprises determining whether a tag hit is achieved for the data array in said tag array.

25. The method of claim 24 wherein said determining whether said data array is capable of satisfying said memory access request further comprises using MESI circuitry to determine whether a tag hit achieved for the data array in said tag array is a true tag hit.

26. The method of claim 19 wherein said cache comprises a multi-level cache.

27. The method of claim 26 wherein each level of said multi-level cache comprises a data array and a corresponding tag array.

28. The method of claim 27 further comprising:

inputting said portion of said virtual address that corresponds to said first portion of said physical address to tag arrays for multiple levels of said multi-level cache before determining an entire physical address.

29. The method of claim 27 further comprising:

inputting at least a portion of said entire physical address to decode circuitry for data arrays of multiple levels of said multi-level cache in parallel, before determining whether any of said data arrays of said multiple levels are capable of satisfying said memory access request.

30. The method of claim 29 wherein said determining whether any of said data arrays of said multiple levels are capable of satisfying said memory access request comprises determining whether a tag hit is achieved in said tag arrays for any of said multiple levels.

31. The method of claim 30 wherein said determining whether any of said data arrays of said multiple levels are capable of satisfying said memory access request further comprises using MESI circuitry to determine whether a tag hit achieved in said tag arrays is a true tag hit.

32. A computer system comprising:

at least one processor that executes instructions synchronous with a clock;

multi-level cache structure accessible by said at least one processor to satisfy memory access requests;

said multi-level cache structure comprising a TLB that receives a virtual address for a memory access request and outputs a corresponding physical address, a data array structure that is capable of being accessed to satisfy said memory access request, decode circuitry that decodes at least a portion of a physical address output by said TLB to determine a physical address to access in said data array structure, tag match circuitry that determines whether a tag hit is achieved for said multi-level cache structure for said memory access request, and MESI circuitry that determines whether said tag hit is a true tag hit; and wherein said multi-level cache is implemented such that said decode circuitry begins executing in a same cycle of said clock that said MESI circuitry is executing for determining whether said tag hit is a true tag hit.

* * * * *